(12) United States Patent
Takahashi et al.

(10) Patent No.: US 7,784,582 B2
(45) Date of Patent: Aug. 31, 2010

(54) DRIVE SWITCHING LEVER STRUCTURE FOR VEHICLE

(75) Inventors: Kosaku Takahashi, Saitama (JP); Masao Takeshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 11/976,905

(22) Filed: Oct. 29, 2007

(65) Prior Publication Data

US 2008/0210483 A1   Sep. 4, 2008

(30) Foreign Application Priority Data

Oct. 31, 2006   (JP)   ............... 2006-296921

(51) Int. Cl.
 *B60K 20/00* (2006.01)
(52) U.S. Cl. .................... 180/336; 74/473.3
(58) Field of Classification Search ............... 180/336; 74/473.15, 473.18, 473.3
See application file for complete search history.

(56) References Cited

U.S. PATENT DOCUMENTS

| | | | | |
|---|---|---|---|---|
| 3,301,084 A | * | 1/1967 | Boda ..................... | 477/113 |
| 3,765,261 A | * | 10/1973 | Hobbins ................ | 74/473.21 |
| 3,902,378 A | * | 9/1975 | Osborn .................. | 74/473.19 |
| 3,994,184 A | * | 11/1976 | Osborn .................. | 74/473.1 |
| RE29,414 E | * | 9/1977 | Prokop .................. | 74/473.3 |
| 4,326,432 A | * | 4/1982 | Miller ................... | 74/473.18 |
| 4,649,766 A | * | 3/1987 | Kiekhaefer ............ | 74/473.15 |
| 4,924,724 A | * | 5/1990 | Yoshimura ............ | 74/473.15 |
| 4,926,688 A | * | 5/1990 | Murasaki .............. | 74/527 |
| 5,022,477 A | * | 6/1991 | Wanie ................... | 180/6.34 |
| 5,048,638 A | * | 9/1991 | Duncan et al. ....... | 180/307 |
| 5,137,106 A | * | 8/1992 | Allen et al. .......... | 180/235 |
| 5,293,763 A | * | 3/1994 | Asano et al. ......... | 70/248 |
| 5,588,934 A | * | 12/1996 | Osborn et al. ....... | 477/96 |
| 5,649,452 A | * | 7/1997 | Osborn et al. ....... | 74/473.33 |
| 5,845,535 A | * | 12/1998 | Wakabayashi et al. | 74/473.18 |
| 5,899,115 A | * | 5/1999 | Kataumi et al. ..... | 74/473.18 |
| 6,067,872 A | * | 5/2000 | Miyahara et al. ... | 74/473.3 |
| 6,098,483 A | * | 8/2000 | Syamoto et al. .... | 74/473.18 |

(Continued)

FOREIGN PATENT DOCUMENTS

DE   4005590 A1 *   8/1991

(Continued)

*Primary Examiner*—Paul N Dickson
*Assistant Examiner*—Nicole Verley
(74) *Attorney, Agent, or Firm*—Birch, Stewart, Kolasch & Birch, LLP

(57) ABSTRACT

A drive switching lever device for a vehicle for a vehicle in which a single control lever can operate both two-wheel-drive/four-wheel drive switching means and a differential lock on/off switching mechanism includes a bell crank swingably supported by a vehicle body side. A pull rod adapted to operate a switching lever of a two-wheel-drive/four-wheel-drive switching means is connected to a lever bracket and a control cable adapted to operate a switching lever of a differential lock on/off switching mechanism is connected to the bell crank. When a control lever is swung independently of the lever bracket, the bell crank is swung in engagement with the shaft portion of the control lever. The resulting configuration provides flexibility for the layout of the linkage between the control lever and the operating portion of each switching mechanism.

21 Claims, 7 Drawing Sheets

U.S. PATENT DOCUMENTS

| | | | |
|---|---|---|---|
| 6,170,353 B1 * | 1/2001 | Worner et al. | 74/473.21 |
| 6,279,937 B1 * | 8/2001 | Hunt | 180/336 |
| 6,431,339 B1 * | 8/2002 | Beattie et al. | 192/220.4 |
| 6,435,054 B1 * | 8/2002 | Duckeck et al. | 74/473.34 |
| 6,691,816 B2 * | 2/2004 | Houston | 180/336 |
| 6,761,084 B2 * | 7/2004 | Suzuki et al. | 74/473.33 |
| 6,848,331 B2 * | 2/2005 | Syamoto | 74/473.23 |
| 6,886,677 B2 * | 5/2005 | Rupiper et al. | 192/219.6 |
| 6,904,996 B2 * | 6/2005 | Mita et al. | 180/336 |
| 7,114,410 B2 * | 10/2006 | Nagasawa | 74/473.18 |
| 7,213,674 B2 * | 5/2007 | Maeda et al. | 180/364 |
| 7,228,753 B2 * | 6/2007 | Kim | 74/473.15 |
| 2001/0004851 A1 * | 6/2001 | Kim | 74/473.15 |
| 2004/0035629 A1 * | 2/2004 | Morin et al. | 180/244 |
| 2007/0056793 A1 * | 3/2007 | Yanagihara et al. | 180/336 |
| 2008/0098844 A1 * | 5/2008 | Kato et al. | 74/473.18 |

FOREIGN PATENT DOCUMENTS

JP  62-46376 B2  10/1987

* cited by examiner

DRIVE SWITCHING LEVER STRUCTURE FOR VEHICLE

CROSS-REFERENCE TO RELATED APPLICATION

The present application claims priority under 35 U.S.C. §119 to Japanese Patent Application No. 2006-296921, filed Oct. 31, 2006, the entire contents of which are hereby incorporated by reference.

BACKGROUND OF THE INVENTION

1. Field of the Invention

The present invention relates to a lever structure that enables two-wheel-drive/four-wheel-drive switching and differential lock on/off switching for a vehicle.

2. Description of Background Art

There has been known a drive switching lever structure that enables a single control lever to operate a two-wheel-drive/four-wheel-drive switching mechanism and a differential lock on/off mechanism (see e.g. Japanese Patent Publication No. Sho 62-046376).

With regard to a two-wheel-drive/four-wheel-drive switching mechanism and to a differential lock on/off switching mechanism both located at the lower portion of a vehicle body and between left and right wheels, the following has been studied: a lever device for operating the switching mechanisms is arranged at a position where it can be operated by an operator during traveling. In this case, the lever device is interlinked with the respective operating portions of the two-wheel-drive/four-wheel-drive switching mechanism and differential lock on/off switching mechanism via interlinking means such as a cable or the like. In this case, it is preferably configured that the flexibility of layout of the interlinking means is improved.

Accordingly, it is an object of the present invention is to improve the flexibility of layout of interlinking means between a control lever and respective operating portions of a two-wheel-drive/four-wheel drive switching means and a differential lock on/off switching mechanism in a drive switching lever device for a vehicle in which the single control lever can operate both the switching mechanisms.

SUMMARY AND OBJECTS OF THE INVENTION

As means for solving the above problem, according to a first aspect of the present invention, a drive switching lever structure for a vehicle (e.g. the saddle-ride type four-wheeler 1 of an embodiment) includes a lever bracket (e.g., the lever bracket 96 of the embodiment) swingably supported by a vehicle body side and a control lever (e.g. the control lever 92 of the embodiment) supported by the lever bracket swingably in a direction different from that of the swing of the lever bracket, in which the single control lever can operate a two-wheel-drive/four-wheel-drive switching mechanism (e.g. the two-wheel-drive/four-wheel-drive switching mechanism 7a) and a differential lock on/off switching mechanism (e.g. the differential lock on/off switching mechanism 7c of the embodiment). The drive switching lever structure also includes a following arm (e.g. the bell crank 102 of the embodiment) rotatably supported by the vehicle body side; first interlinking means (e.g. the pull rod 106 of the embodiment), connected to the lever bracket, for operating an operating portion (e.g. the switching lever 105 of the embodiment) of one of the switching mechanisms; and second interlinking means (e.g. the control cable 104 of the embodiment), connected to the following arm, for operating an operating portion (e.g. the switching lever 108 of the embodiment) of the other of the switching mechanisms; wherein when the control lever is swung independently of the lever bracket, the following arm is swung in engagement with a shaft portion (e.g. the shaft portion 92a of the embodiment) of the control lever.

According to a second aspect of the present invention, the following arm is formed in a scissors-shape having a slit (e.g. the slit 103 of the embodiment) engageable with and disengageable from the shaft portion of the control lever.

According to a third aspect of the present invention, the following arm has play (e.g. the play S1 of the embodiment) adapted to permit the swing of the control lever.

According to a fourth aspect of the present invention, at least one of the interlinking means is a rod.

According to a fifth aspect of the present invention, the first interlinking means is connected to the lever bracket from one direction and the second interlinking means is connected to the following arm from another direction.

EFFECTS OF THE INVENTION INCLUDES THE FOLLOWING

According to the first aspect of the present invention, with this configuration, the following arm can be arranged relatively freely as long as it is located at a position engageable with the shaft portion of the control lever. This increases the flexibility of the relative layout between the following arm and the lever bracket. Thus, the flexibility of layout can be improved in the case where respective interlinking means located between the lever bracket and the switching mechanism and between the following arm and the switching mechanism are connected to the lever bracket and the following arm, respectively.

According to the second aspect of the present invention, the control lever is permitted to move along the slit and then can reliably be engaged with the following arm.

According to the first third of the present invention, the following arm enables the control lever to enter in one direction and then permits it to move in another direction, thereby easily realizing the various movement of the control lever.

According to the fourth aspect of the present invention, a lever operating feeling can be improved at the time of operating each of the switching mechanisms.

According to the fifth aspect of the present invention, the arrangement of the interlinking means can be optimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
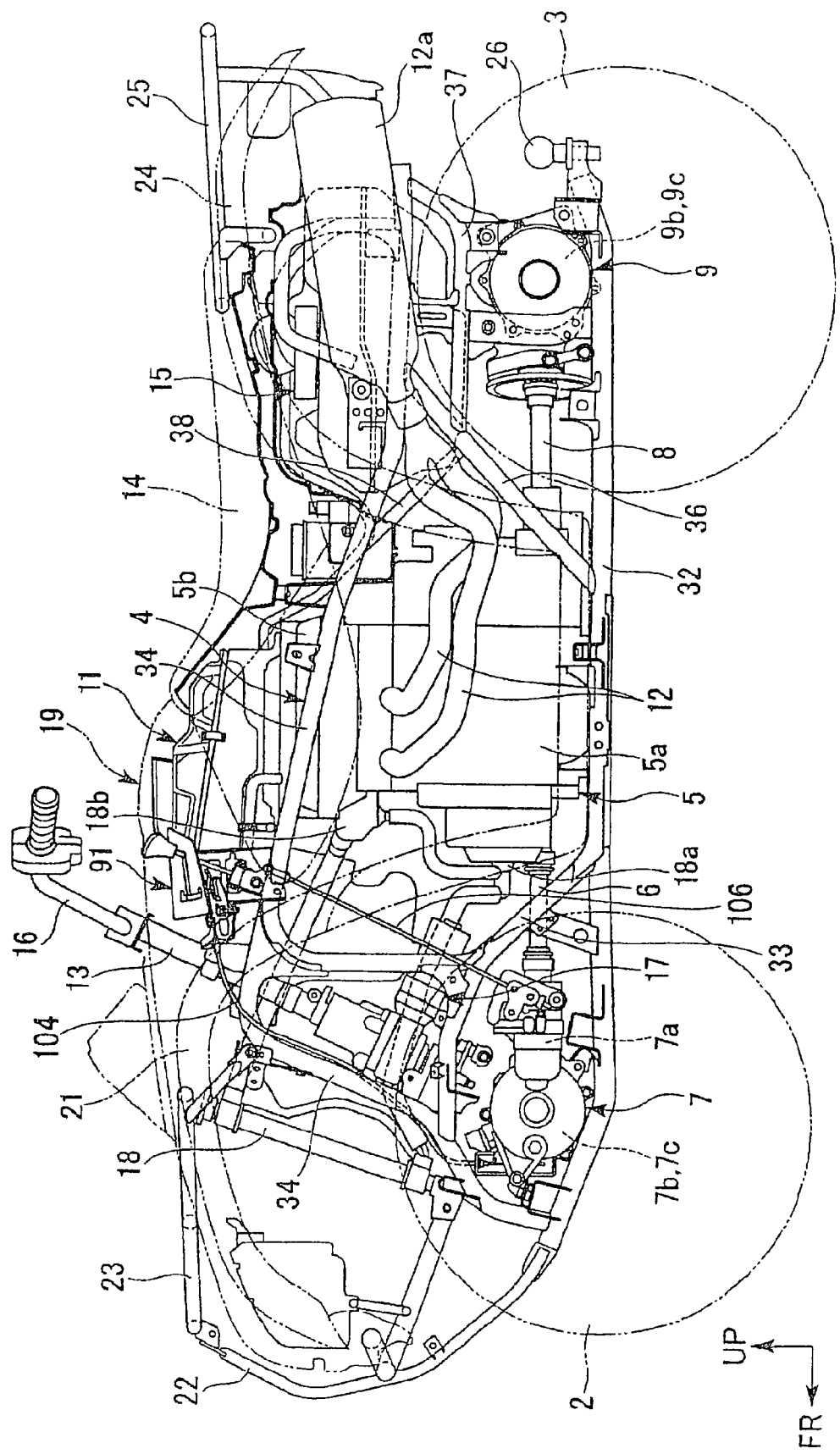
FIG. 1 is a lateral view of a saddle-ride type four-wheeler according to the present invention.

It is to be noted that directions such as the front, the rear or back, the left and the right are the same as those of a vehicle unless otherwise designated. Arrows FR, LH and UP in the drawings designate the front, left and upside, respectively, of the vehicle.

DETAILED DESCRIPTION OF THE PREFERRED EMBODIMENTS

A saddle-ride type four-wheeler (vehicle) shown in FIG. 1 is configured as the so-called ATV (All Terrain Vehicle). This vehicle includes a vehicle body constructed to be reduced in size and in weight and left and right front wheels 2 and rear wheels 3 provided at the front and rear portions, respectively, of the vehicle body. The wheels are low pressure balloon tires having a large diameter. Thus, the ATV ensures a large minimum ground clearance to enhance traveling performance mainly on the irregular ground.

A body frame 4 of the saddle-ride type four-wheeler is formed to have a longitudinally long box structure in a vehicle-widthwise (left-right-directionally) central portion. Independent front suspensions (not shown) are supported by the front portion of the body frame 4 and similarly independent rear suspensions (not shown) are supported by the rear portion of the body frame 4.

An engine (internal combustion engine) 5 serving as a prime mover of the vehicle is mounted on an almost-central portion of the body frame 4. The engine 5 is a water-cooled two-cylinder engine for instance and is arranged in a longitudinally mount layout in which the rotary axis of a crankshaft extends in a back-and-forth direction. A crankcase 5a constituting the lower portion of the engine 5 also serves as a transmission case. Front and rear propeller shafts 6 and 8 extend from the lower front side and rear side of the crankcase 5a toward the front and the rearward, respectively.

The propeller shafts 6 and 8 can transmits power to the left and right front and rear wheels 2 and 3 through front and rear final assemblies 7 and 9 and drive shafts not shown supported by the front lower portion and rear lower portion, respectively, of the body frame 4. In other words, the rotational drive force is transmitted from the engine 5 through a transmission (not shown) in the crankcase 5a to the propeller shafts 6 and 8 and then through the final assemblies 7 and 9 and the like to the left and right front and rear wheels 2 and 3, respectively.

The front final assembly 7 accommodates a two-wheel-drive/four-wheel-drive switching mechanism 7a in the rear portion of its casing and a differential mechanism 7b and a differential lock on/off switching mechanism 7c in the front portion of the casing. The two-wheel-drive/four-wheel-drive switching mechanism 7a can connect and disconnect the rotational drive force from the front propeller shaft 6. The differential mechanism 7b can absorb a difference in rotational velocity between the left and right drive shafts (left and right front wheels 2). The differential lock on/off switching mechanism 7c enables the differential lock mechanism 7b to be differential-locked. On the other hand, the rear final assembly 9 accommodates a differential mechanism 9b and a differential lock on/off switching mechanism 9c in its casing. The differential mechanism 9b can absorb a difference in rotational velocity between the left and right drive shafts (left and right rear wheels 3). The differential lock on/off switching mechanism 9c enables the differential mechanism 9b to be differential-locked.

A cylinder portion 5b is provided on the crankcase 5a of the engine 5 so as to extend upward. An air cleaner 11 for engine intake air is disposed right above the cylinder portion 5b. The outside air filtered in the air cleaner 11 is sucked in the cylinder from the right side of the cylinder portion 5b through a throttle body not shown. Exhaust gas is led to the outside from the inside of the cylinder through an exhaust pipe 12 connected to the left side of the cylinder portion 5b. The exhaust pipe 12 bends at the left side of the cylinder portion 5b, extending rearward, and is coupled to a silencer 12a disposed on the left side of the body rear portion.

A steering shaft 13, the air cleaner 11 and a saddle-ride type seat 14 for occupants are arranged in order from the front on the upper portion of the body frame 4. A fuel tank 15 is disposed below the rear portion of the seat 14. A handlebar 16 is attached to the upper end of the steering shaft 13. Knuckles (not shown) of the left and right front wheels 2 are connected to the lower end portions of the steering shaft 13 through the left and right tie-rods. Thus, the turning operation of the handlebar 16 can give a steering angle to the left and right front wheels 2.

An electric motor-integral type actuator unit 17 is provided at the lower portion of the steering shaft 13. In other words, an electrically-powered steering device is configured to use the electric motor as a drive force and give a steering assist force to a steering system. A radiator 18 for cooling the engine is disposed forward of the lower portion of the steering shaft 13. In the figure, reference numeral 18a denotes a water pump disposed on the front side of the crankcase 5a and 18b denotes a thermostat disposed on the front side of the cylinder portion 5b of the engine 5.

A resin-made body front cover 19, a resin-made front fender 21, a front protector 22 and a front carrier 23 are attached to the front portion of the body frame 4. The body front cover 19 appropriately covers the front portion of the vehicle body. The front fender 21 covers the left and right front wheels 2 from above and from rear. The front protector 22 and front carrier 23 are mainly made of a steel material. A resin-made rear fender 24, a rear carrier 25 and a trailer hitch 26 are attached to the rear portion of the body frame 4. The rear fender 24 covers the left and right rear wheels 3 from above and from the front. The rear carrier 25 and trailer hitch 26 are mainly made of a steel material.

Figure 2:
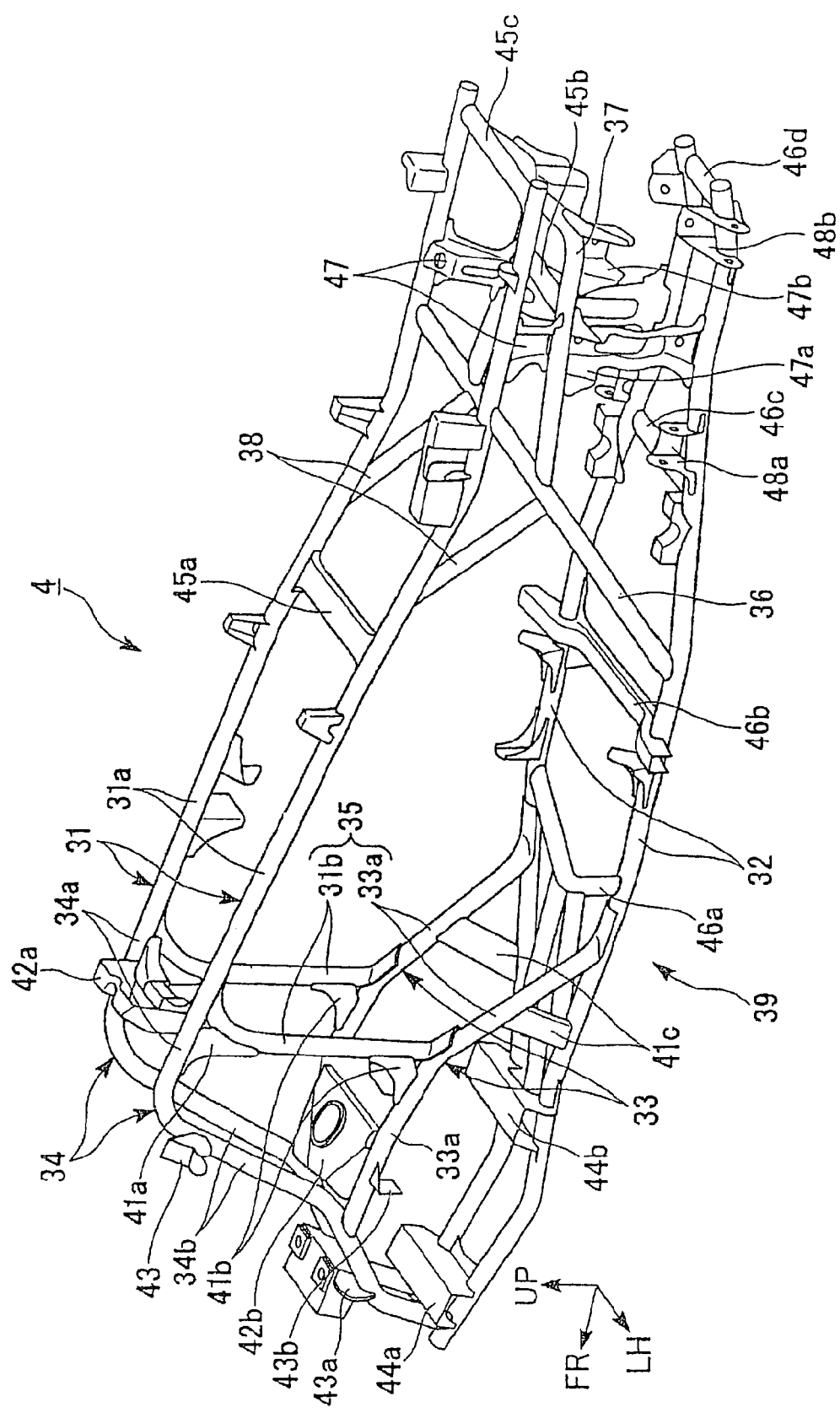
FIG. 2 is a perspective view of a body frame of the four-wheeler.

Referring additionally to FIG. 2, the body frame 4 is configured by integrally joining together a plurality of steel members by welding or the like. Specifically, the body frame 4 is formed as a box structure elongate in a back and forth direction at the vehicle-widthwise central portion by forming a pair of left and right closed loop structures by using left and right upper frames 31, left and right lower frames 32 and other frames and by joining together the closed loop structures through a plurality of cross members.

Each of the upper frames 31 includes an upper slant portion 31a and a front hanging portion 31b. The upper slant portion 31a slants slightly rearward downwardly and extends on the outside of the upper portion of the body frame 4. The front hanging portion 31b extends downward from the front end of the upper slant portion 31a. The upper frame 31 is integrally formed by bending a single steel pipe or by subjecting it to other processes.

On the other hand, each of the lower frames 32 is arranged almost horizontally on the outside of the lower portion of the body frame 4 and is integrally formed by bending a single steel pipe or by subjecting it other processes. The lower frames 32 are gently bent so that a distance between their front-rear intermediate portions is maximized and respective distances between their front portions and between their rear portions are reduced. The front and rear end portions of each lower frame 32 are formed to bend forwardly upwardly and rearward upwardly, respectively.

A front lower sub-frame 33 extends forwardly upwardly from the front side of the intermediate portion of each lower frame 32. Each front lower sub-frame 33 is then formed to bend so that the angle of inclination of the front slant portion 33b is reduced relative to the rear slant portion 33a.

A front sub-frame 34 extends from the front side of the upper slant portion 31a of each upper frame 31 toward the front end portion of each lower frame 32 in an appropriately bending manner. The front sub-frame 34 includes an upper slant portion 34a formed to extend from the front side of the upper slant portion 31a of each upper frame 31 in parallel thereto and a front hanging portion 34b formed to bend downward from the upper slant portion 34a and extend obliquely and forwardly downwardly. The front hanging portion 34b reaches the front end portion of the lower frame 32 while forming such a crank shape that its lower portion gently bends forwardly.

The front end portion of each front lower sub-frame 33 is joined from the rear to the crank shape portion of the front hanging portion 34b of each front sub-frame 34. In addition, the lower end portion of the front hanging portion 31b of each upper frame 31 is joined from above to the front-rear intermediate portion of each front lower sub-frame 33. A portion continuously composed of the front hanging portion 31b of each upper frame 31 and the rear slant portion 33a of the front lower sub-frame 33 is called a front side down frame portion 35 in some cases.

A rear support frame (hereinafter, sometimes referred to as a rear side down frame) 36 spans between the rear portion of each upper frame 31 and the rear side of the intermediate portion of each lower frame 32 so as to slant rearward upwardly. A rear sub-frame 37 extends rearward from the upper portion of each rear support frame 36 and its rear end portion bends upward and is joined from below to the rear end portion of each upper frame 31. A rear gusset frame 38 spans between the upper portion of each rear support frame 36 and the intermediate portion of each upper frame 31 so as to slant rearward upwardly.

The upper frames 31, front side down frame portions 35, lower frames 32, and rear side down frames 36 constitute a pair of left and right closed loop structures and a main frame portion 39 supporting the engine 5 is constructed in this closed loop structures.

In the figure, an upper gusset 41a spans between a bent portion between the upper slant portion 31a and front hanging portion 31b of each upper frame 31, and the upper slant portion 34a of each front sub-frame 34. A middle gusset 41b spans between the front hanging portion 31b of the upper frame 31 and the front slant portion 33b of the front lower sub-frame 33. A lower gusset 41c spans between the rear slant portion 33a of each front lower sub-frame 33 and the front portion of each lower frame 32. An upper portion support bracket 42a for the steering shaft 13 spans between the upper slant portions 34a of the front sub-frames 34. A lower portion support plate 42b for the steering shaft 13 spans between the front slant portions 33b of the front lower sub-frames 33.

In the figure, a cushion upper portion support bracket 43 is fixedly attached to the front hanging portion 34b of each front sub-frame 34. An upper arm front portion support cross member 43a spans between the crank-shaped portions of the front hanging portions 34b of the front sub-frames 34. An upper arm rear portion support bracket 43b is fixedly attached to the front slant portion 33b of each front lower sub-frame 33. A lower arm front portion support cross member 44a spans between the front ends of the lower frames 32. A lower arm rear portion support cross member 44b spans between the front ends of the lower frame 32.

In the figure, a center upper cross member 45a spans between the intermediate portions of the upper frames 31. A rear upper cross member 45b spans between the intermediate portions of the rear sub-frames 37. A rear end upper cross member 45c spans between the rear ends of the upper frames 31. A center cross member 46a spans between the front sides of the intermediate portions of the lower frames 32. A stepped portion cross member 46b spans between the rear sides of the intermediate portion of the lower frames 32. A rear cross member 46c spans between the rear portions of the lower frames 32. A rear end cross member 46d spans between the rear ends of the lower frames 32.

In the figure, a cushion upper portion support bracket 47 spans between the rear portion of the upper frame 31 and the intermediate portion of the rear sub-frame 37. An upper arm front portion support bracket 47a spans between the intermediate portion of the rear sub-frame 37 and the rear portion of the lower frame 32. An upper arm rear support bracket 47b is fixedly attached to the rear portion of the rear sub-frame 37. A lower arm front portion support bracket 48a is fixedly attached to the rear portion of the lower frame 32. A lower arm rear portion support bracket 48b fixedly attached to the rear end of the lower frame 32.

Figure 3:
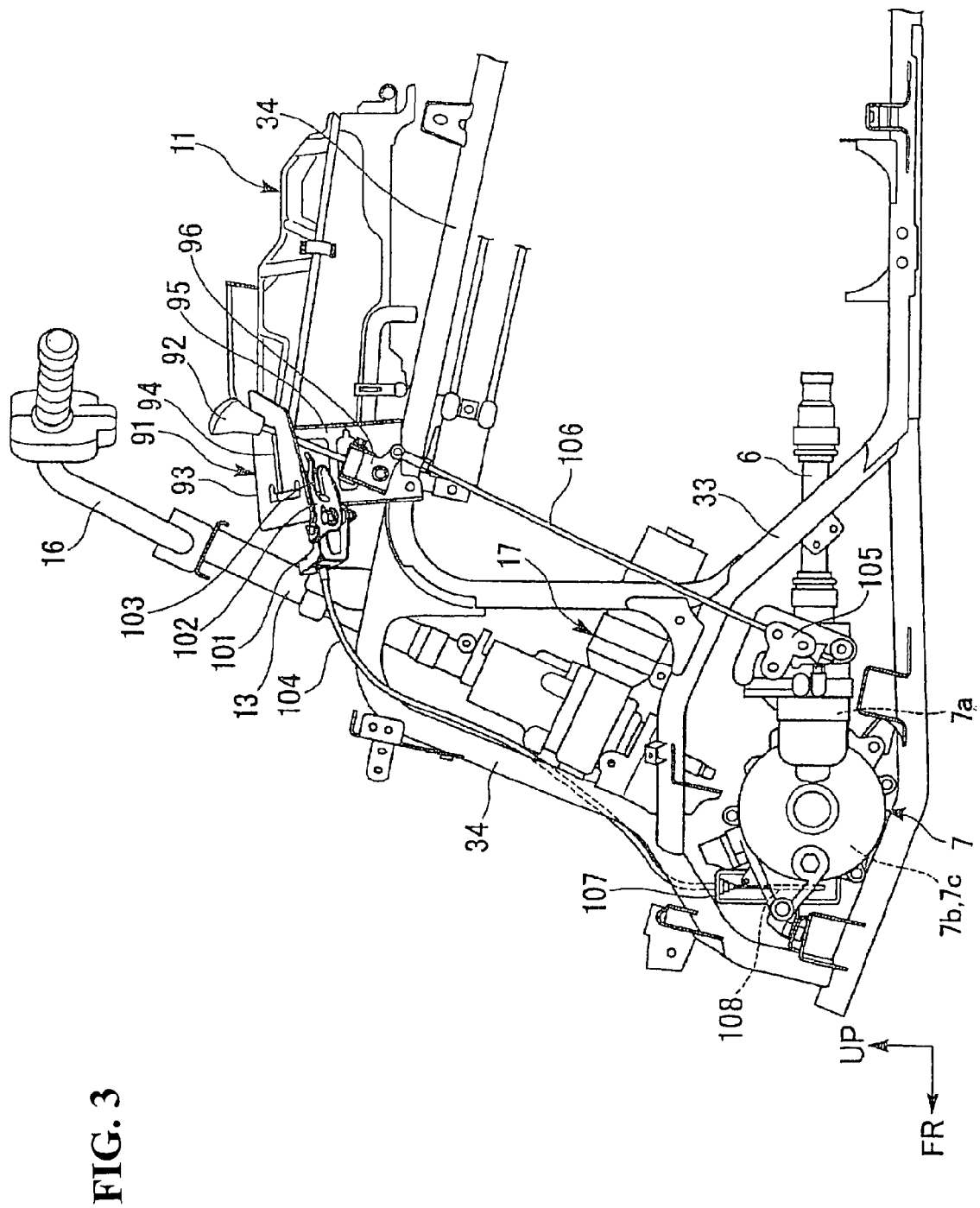
FIG. 3 is a lateral view of a vehicle body front portion of the four-wheeler.

Referring to FIG. 3, two-wheel-drive/four-wheel-drive switching and differential lock on/off switching in the front final assembly 7 is carried out by operating a drive switching lever device (hereinafter, simply referred to as the lever device) 91 disposed on the left side of the vehicle body upper portion.

The lever device 91 is such that a single control lever 92 is used to enable the operations of the two-wheel-drive/four-wheel-drive switching mechanism 7a and the differential lock on/off switching mechanism 7c. The single lever 92 is provided to project upward from a plate-like control panel 93 located slightly rearward of the steering shaft 13 and extending substantially parallel to the outer surface of a body front cover 19.

Figure 4:
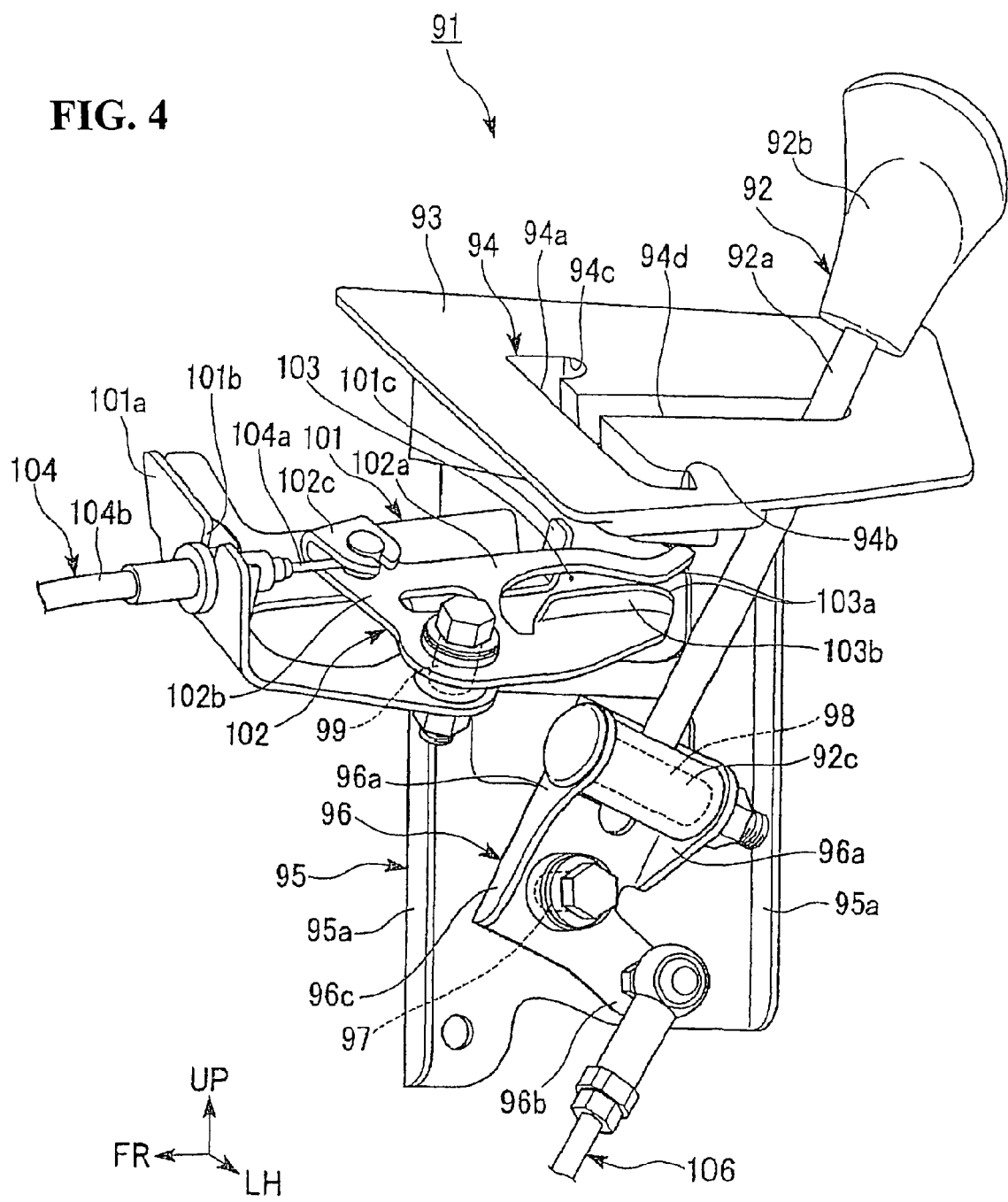
FIG. 4 is a perspective view of a drive-switching lever device of the four-wheeler.

Referring additionally to FIG. 4, the control panel 93 is made of e.g. resin, arranged to slant such that its left front portion is downside and is formed in a deformed trapezoid as viewed from above such that its rear portion and left portion are reduced in width. The control panel 93 is formed at its front portion with a lateral slit 94a extending lateral to the front side thereof. The lateral slit 94a is formed in its left and right ends with left and right notches 94b and 94c, respectively, shallowly notched toward the rearward. In addition, the control panel 93 is formed at its left-right intermediate portion with a longitudinal slit 94d which extends parallel to the right side of the panel from the vicinity of the right notch 94c of the lateral slit 94a. The slits 94a, 94b and notches 94b, 94c form a guide groove 94 almost-E shaped as viewed from above in the control panel 93.

The control lever 92 integrally includes a shaft portion 92a extending substantially upward and downward; a knob 92b provided on the upper side of the shaft portion 92a; and a collar 92c provided at the lower end of the shaft portion 92a so as to be orthogonal thereto. The control lever 92 is such that the shaft portion 92a passes through the guide groove 94 of the control panel 93 upward and downward, the knob 92b is disposed above the control panel 93 and the color 92c is disposed below the control panel 93. The control lever 92 is movable so as to move the knob 92b along the guide groove 94 of the control panel 93.

The control panel 93 is provided on its right side (vehicle-widthwise inside) integrally with a support frame 95 extending downward and is secured to the body frame 4 via the support frame 95. The support frame 95 is made of e.g. a steel plate extending almost-perpendicularly to the vehicle-widthwise direction and is formed in an almost-rectangle elongated upward and downward. The support frame 95 is formed at its front and rear edge portions with reinforcing flanges 95a extending leftward therefrom and at its upper portion with an appropriate weight-reduction hole. A relatively small-sized lever bracket 96 is supported by the lower portion of the support frame 95 swingably around a first swing shaft 97 perpendicular to the support frame 95.

The lever bracket 96 is made of e.g. a steel plate extending parallel to the left side surface of the support frame 95 and is formed in an almost-rectangle elongated upward and downward. The lever bracket 96 is formed at the front and rear edge portions of the upper portion thereof with support flanges 96a extending leftward therefrom. In addition, the lever bracket 96 is formed on the rear side of the lower portion thereof with a rod connection portion 96b connectable with the upper end portion of a pull rod 106 described later. The lever bracket 96 is formed at its front edge portion with a reinforcing flange 96c continuous with the support flange 96a. A stepped bolt as the first swing shaft 97 is passed through the lower portion of the lever bracket 96 and through the lower portion of the support frame 95 from the vehicle-widthwise outside and fastened thereto. Thus, the lever bracket 96 is supported by the support frame 95 so as to be swingable in the back and forth direction (so that its upper portion can be movable in the back and forth direction).

The collar 92c located at the lower end of the control lever 92 is disposed between the front and rear support flanges 96a, opposed to each other, of the lever bracket 96. A stepped bolt as a second swing shaft 98 is passed through the collar 92c and through the front and rear support flanges 96a and fastened thereto. Thus, the lower end of the control lever 92 is supported by the lever bracket 96 so as to be swingable leftward and rightward (so that the knob 92b is movable leftward and rightward).

It can be said that the control lever 92 is supported by the support frame 95 so as to be swingable in the back and forth direction through the lever bracket 96 (so that the knob 92b can be movable in the back and forth direction). That is to say, the control lever 92 is supported by the support frame 95 in the two directions, the back and forth direction and the left and right direction, through the swing shafts 97, 98 orthogonal to each other.

A plate-like support stay 101 is provided integrally with the left side of the front portion of the support frame 95 so as to slant similarly to the control panel 93. The support stay 101 is made of e.g. a steel plate. A bell crank 102 is swingably supported by the upper surface of the support stay 101 via a third swing shaft 99 orthogonal to the support stay 101. The bell crank 102 is made of e.g. a steel plate and includes a scissors-type rear arm 102a and a right arm 102b. The rear arm 102a extends rearward from its proximal portion adapted to receive the third swing shaft 99 passed therethrough and the right arm 102b extends rightward from the proximal portion. A stepped bolt as the third swing shaft 99 is passed from above through the bell crank and the support stay 101 and is fastened thereto. Thus, the bell crank 102 is swingably supported by the support stay 101.

When the control lever 92 is swung around the first swing shaft 97 along with the lever bracket 96, the shaft portion 92a of the control lever 92 can be inserted into and removed from the rearward-open slit 103 of the rear arm 102a included in the bell crank 102. A cable engaging portion 102c is provided at the leading end of the right arm 102b of the bell crank 102 so as to be engageable with an end (cable end) of an inner cable 104a included in a control cable 104 detailed later. A front wall portion 101a which is a rising front portion of the support stay 101 is provided forward of the cable engaging portion 102c. The front wall portion 101a is formed with a cable retaining portion 101b which can retain an end of an outer cable 104b of the control cable 104.

The control cable 104 is such that the inner cable 104a is slidably inserted into the outer cable 104b and can be arranged to be bent relatively freely because of having flexibility. The inner cable 104a is slidably moved with the outer cable 104b retained so that a pull-directional force applied to one end of the inner cable 104a can be transmitted to the other end thereof. The outer cable 104b of the control cable 104 extends forward from the cable retaining portion 101b forward of the support stay 101, extending while bending downward and vehicle-widthwise inward, and then reaches a cable retaining portion 107 at the front end portion of the differential lock on/off switching mechanism 7c.

The outer cable 104b has one end portion retained by the cable retaining portion 101b of the support stay 101 and the other end portion retained by the cable retaining portion 107 of the differential lock on/off switching mechanism 7c. The inner cable 104a has one end portion engaged with the cable engaging portion 102c of the bell crank 102 and the other end engaged with the leading end portion of a switching lever 108 below the cable retaining portion 107 of the differential lock on/off switching mechanism 7c. In other words, the control cable 104 is connected to the bell crank 102 from the front and to the switching lever 108 from above. The switching lever 108 is biased so that its leading end portion is moved downward and the bell crank 102 is biased so that the cable engaging portion 102c is moved forward.

The pull rod 106 made of e.g. a linear metal rod is disposed between the rod connection portion 96b of the lever bracket 96 and the switching lever 105 located on the left side of the upper portion of the front final assembly 7 (the two-wheel-drive/four-wheel-drive switching mechanism 7a). The pull rod 106 is slanted such that its upper portion is located rearward. In addition, the upper end portion of the pull rod 106 is swingably connected to the rod connection portion 96b via a bolt or the like and the lower end is swingably connected to the leading end of the switching lever 105 via an adjusting mechanism or the like. In other words, the pull rod 106 is connected to the lever bracket 96 from below and to the switching lever 105 from above. The switching lever 105 is biased so that its leading end is moved downward and the lever bracket 96 is biased so that the rod connection portion 96b is moved downward.

As shown in FIG. 4, if the control lever 92 is located in the longitudinal slit 94d of the guide groove 94, it is moved to the rear end position of the longitudinal slit 94d by the biasing force applied to the switching lever 105 and to the lever bracket 96. In this case, the rod connection portion 96b of the lever bracket 96 and the leading end of the switching lever 105 are moved downward. In this state, the two-wheel-drive/four-wheel-drive switching mechanism 7a is brought into a two-wheel-drive condition where the rotary drive force transmitted from the front propeller shaft 6 is disconnected. In other words, when the drive of the left and right front wheels 2 is not necessary, the transmission of the power needed to drive the front wheels is disconnected, thereby enhancing power consumption.

Figure 5:
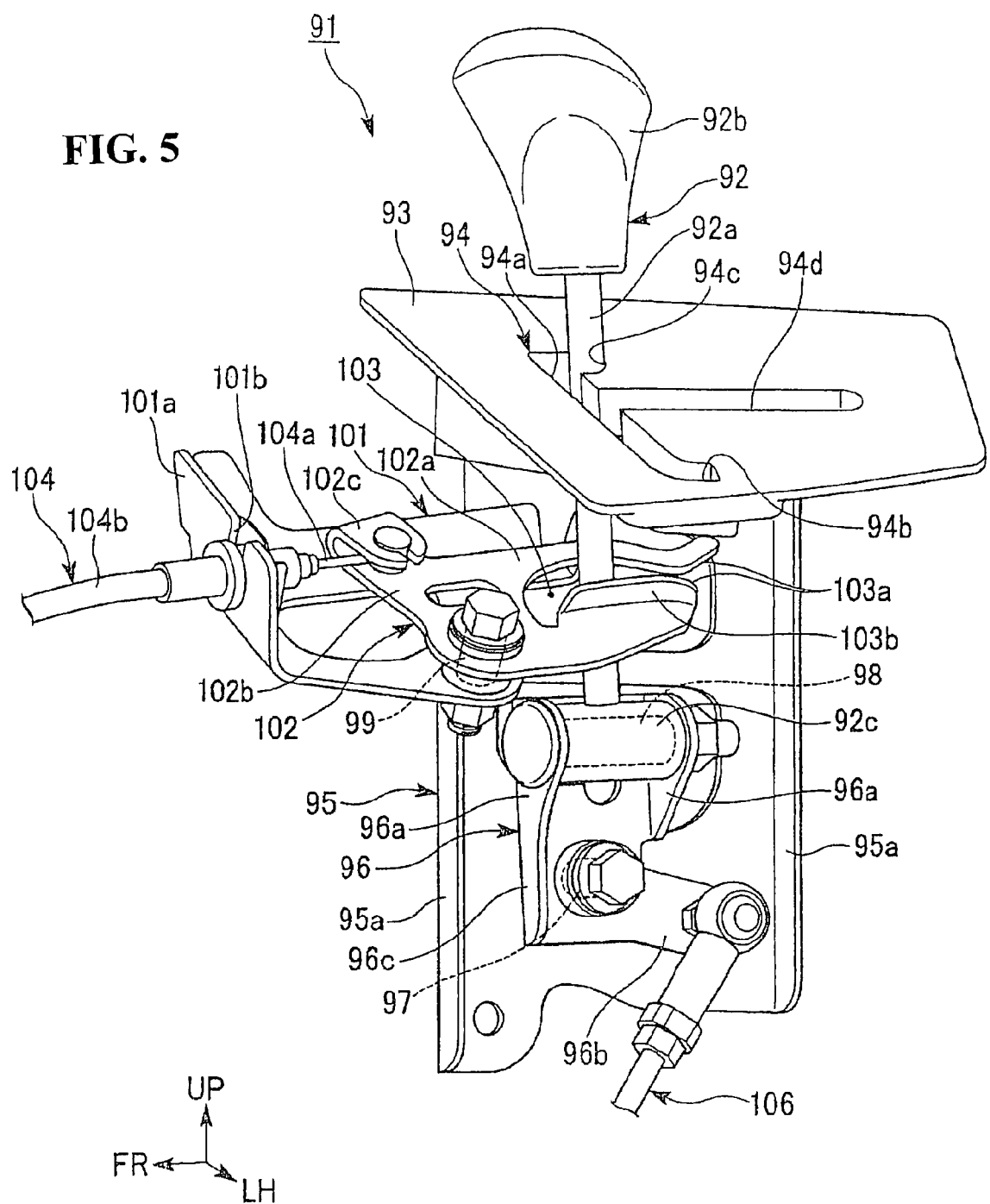
FIG. 5 is an explanatory view of first operation of the lever device.
Figure 6:
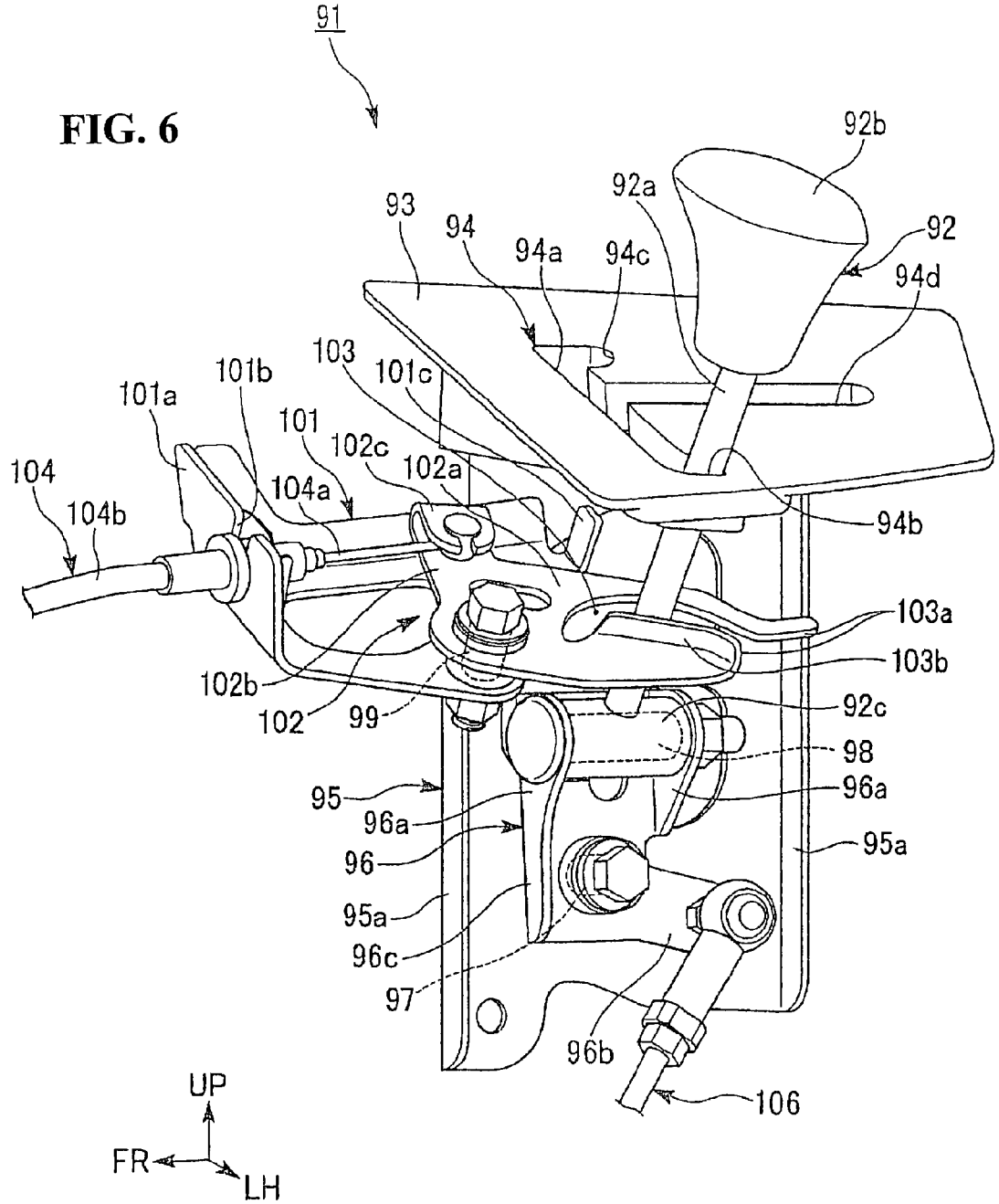
FIG. 6 is an explanatory view of second operation of the lever device.

On the other hand, if the control lever 92 is moved (turned) to the front end position (the position of the lateral slit 94a) of the longitudinal slit 94d, the lever bracket 96 is swung along with this movement to move the rod connection portion 96b upward and to swing the switching lever 105 via the pull rod 106, thereby moving the leading end upward (see FIGS. 5 and 6). In this case, the two-wheel-drive/four-wheel-drive switching mechanism 7a is brought into a four-wheel-drive condition where the transmission of the rotary drive force from the front propeller shaft 6 is connected.

Referring to FIG. 5, if the control lever 92 is moved to the right end position (the position of the right notch 94c) of the lateral slit 94a, the cable engaging portion 102c of the bell crank 102 moves forward to slidably move the control cable 104 and the leading end of the switching lever 108 moves downward. In this state, the two-wheel-drive/switching mechanism 7a is brought into a four-wheel-drive condition and the differential lock on/off switching mechanism 7c is brought into a differential free condition where the differential lock is released (the differential mechanism 7b is made operable). In other words, the left and right front wheels can be driven at differential rotation speeds by use of a difference in resistance from the road surface. This absorbs a rotational speed difference between the left and right front wheels based on a difference in turning radius encountered when the vehicle rounds the bend, thereby enabling smooth traveling.

On the other hand, as shown in FIG. 6, if the control lever 92 is moved to the left end position (the position of the left notch 94b) of the lateral slit 94a, the shaft portion 92a of the control lever 92 turns the bell crank 102 while sliding along the left edge portion of the slit 103. Thus, the cable engaging portion 102c of the bell crank 102 is moved rearward and the leading end of the switching lever 108 is moved upward via the control cable 104. In this state, the two-wheel-drive/ switching mechanism 7a is brought into a four-wheel-drive condition and the differential lock on/off switching mechanism 7c is brought into a differential lock condition where the differential lock is activated (the differential mechanism 7b is made inoperative). In other words, the left and right front wheels can be driven at the same rotational speed regardless of the difference in resistance from the road surface. Even if one of the left and right front wheels slips, the other can be driven, whereby the traveling performance on the punishing road is enhanced.

Figure 7:
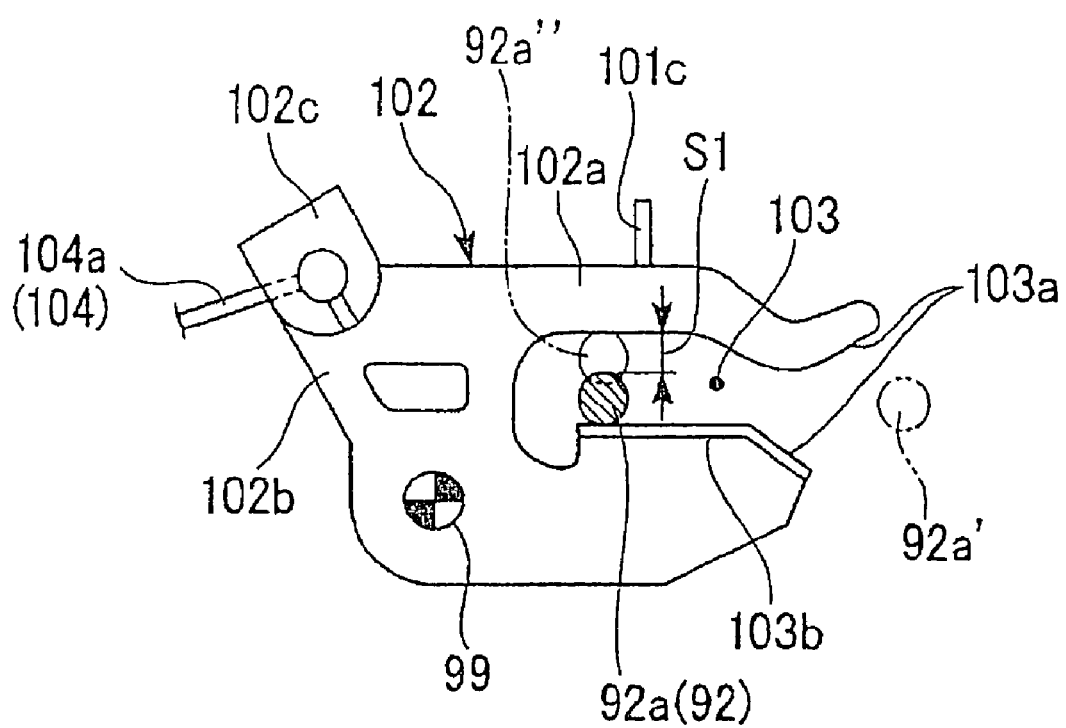
FIG. 7 is a plan view taken along a rotary shaft of a bell crank included in the lever device.

Referring to FIG. 7, if the control lever 92 is moved to the rear end position of the longitudinal slit 94d, the shaft portion 92a of the control lever 92 is disengaged from the slit 103 of the bell crank 102 (indicated with reference numeral 92a'). In this case, the swing of the bell crank 102 to move the cable engaging portion 102c forward (toward the biased side) is restricted by the abutment of the upper edge portion of the rear arm 102a against a stopper piece 101c formed on the support stay 101. In this state, the shaft portion 92a of the control lever 92 is movable into and out of the slit 103 without the swing of the bell crank 102, between the front end position and rear end position of the longitudinal slit 94d. Incidentally, the bell crank 102 is formed on the open side of the slit 103 with slant portions 103a adapted to guide the entry of the shaft portion 92a of the control lever 92.

When the control lever 92 is moved in the longitudinal slit 94d, the shaft portion 92a of the control lever 92 is slightly slidably moved along a short flange 103b extending to rise from the left edge portion of the slit 103. The intermediate portion of the slit 103 has an enlarged width and a play S1 is provided between the right edge portion of the slit 103 and the shaft portion 92a. This play S1 corresponds to the travel distance of the shaft portion 92a of the control lever 92 from the front end position of the longitudinal slit 94d to the right end position of the lateral slit 94a (the position of the right notch 94c). When the control lever 92 travels from the front end position of the longitudinal slit 94d to the right end position of the lateral slit 94a, the shaft portion 92a of the control lever 92 is spaced apart from the left end portion of the slit 103 within the play S1 (indicated with reference numeral 92a" in the figure). In short, the control lever 92 can solely be swung without swinging the bell crank 102.

As shown in FIG. 5, the movement of the control lever 92 is restricted at the right end position by the shaft portion 92a of the control lever 92 which is moved into the right notch 94c by the biasing force applied to the lever bracket 96 or the like. Similarly, as shown in FIG. 6, the movement of the control lever 92 is restricted at the left end position by the shaft portion 92a which is moved into the left notch 94b by the biasing force applied to the lever bracket 96 or the like. In this case, the downward travel distance of the rode connection portion 96b of the lever bracket 96 is sufficiently small compared with the stroke needed to operate the two-wheel-drive/ four-wheel-drive switching mechanism 7a.

As described above, the drive switching structure of the saddle-ride type four-wheeler according to the present embodiment includes the lever bracket 96 swingably supported by the vehicle body side and the control lever 92 supported by the lever bracket 96 swingably in a direction orthogonal to the lever bracket 96. The single control lever 92 can operate the two-wheel-drive/four-wheel-drive switching mechanism 7a and differential lock on/off switching mechanism 7c. The drive switching lever structure includes the bell crank 102 swingably supported by the vehicle body side. The pull rod 106 adapted to operate the switching lever 105 of the two-wheel-drive/four-wheel-drive switching mechanism 7a is connected to the lever bracket 96. The control cable 104 adapted to operate the switching lever 108 of the differential lock on/off switching mechanism 7c is connected to the bell crank 102. When the control lever 92 is swung independently of the lever bracket 96, the bell crank 102 is swung in engagement with the shaft portion 92a of the control lever 92.

With the configuration described above, the bell crank 102 can be arranged relatively freely as long as it is located at a position engageable with the shaft portion 92a of the control lever 92. This increases the flexibility of the relative layout between the bell crank 102 and the lever bracket 96. Thus, the flexibility of layout is improved in the case where respective interlinking means located between the lever bracket 96 and the switching mechanism 7a and between the bell crank 102 and the switching mechanism 7c are connected to the lever bracket 96 and the bell crank 102, respectively. Since the two-wheel-drive/four-wheel-drive switching means 7a is operated via the pull rod 106, a lever operation feeling encountered when the two-wheel-drive/four-wheel-drive is switched can be enhanced.

In the drive switching lever structure, the bell crank 102 is formed in a scissors-shape having the slit 103 engageable with and disengageable from the shaft portion 92a of the control lever 92. Thus, the control lever 92 is permitted to move along the slit 103 and then can reliably be engaged with the bell crank 102.

In the drive switching structure, further the bell crank 102 has the play S1 adapted to permit the swing of the control lever 92. Thus, the bell crank 102 enables the control lever 92 to enter from one direction (leftward) and then permits it to move toward another direction (rightward), thereby easily realizing the various movement of the control lever 92.

In the drive switching structure, furthermore, the pull rod 106 connected to the two-wheel-drive/four-wheel-drive switching mechanism 7a is connected from below to the lever bracket 96 and the control cable 104 connected to the differential lock on/off switching mechanism 7c is connected from the front to the bell crank 102. Thus, the arrangement of the pull rod 106 and control lever 92 can be optimized.

Incidentally, the present invention is not limited to the embodiment described above. For example, it is not necessary that the swing direction of the lever bracket is orthogonal to the swing direction of the control lever and that the following arm relative to the control lever is the bell crank. A configuration may be acceptable in which the two-wheel-drive/four-wheel-drive switching mechanism is interlinked with the bell crank (the following arm) and the differential lock on/off switching mechanism is interlinked with the lever bracket. Further, the respective interlinking means between the following arm and one of the switching mechanisms and between the lever bracket and the other of the switching mechanisms may be any one of a rod and a cable. The rod connected to each switching mechanism may be a push rod or a rotary rod other than the pull rod. The interlinking means between the control lever and each switching mechanism may include a link, a gear, a ball screw, a cam, a chain, a belt, and a hydraulic device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A drive switching lever structure for a vehicle, including a lever bracket swingably supported by a vehicle body side and a single control lever supported by the lever bracket swingably in a direction different from that of a swing of the lever bracket, in which the single control lever can operate a two-wheel-drive/four-wheel-drive switching mechanism and a differential lock on/off switching mechanism, the drive switching lever structure comprising:
    a following arm rotatably supported by the vehicle body side;
    first interlinking means, connected to the lever bracket, for operating an operating portion of one of the switching mechanisms; and
    second interlinking means, connected to the following arm, for operating an operating portion of the other of the switching mechanisms;
    wherein when the control lever is swung independently of the lever bracket, the following arm is swung in engagement with a shaft portion of the control lever,
    wherein the following arm is formed in a scissors-shape having a slit,
    wherein the shaft portion of the control lever is movable from a position outside the slit to another position directly inside the slit.

2. The drive switching lever structure according to claim 1, wherein the first interlinking means is connected to a lower end of the shaft portion of the control lever.

3. The drive switching lever structure according to claim 2, wherein the following arm has play adapted to permit the swing of the control lever.

4. The drive switching lever structure according to claim 2, wherein at least one of the interlinking means is a rod.

5. The drive switching lever structure according to claim 2, wherein the first interlinking means is a rigid member connected to the lever bracket from one direction and the second interlinking means is a flexible connected to the following arm from another direction.

6. The drive switching lever structure according to claim 1, wherein the following arm has play adapted to permit the swing of the control lever.

7. The drive switching lever structure according to claim 6, wherein at least one of the interlinking means is a rod.

8. The drive switching lever structure according to claim 1, wherein at least one of the interlinking means is a rod.

9. The drive switching lever structure according to claim 1, wherein the first interlinking means is connected to the lever bracket from one direction and the second interlinking means is connected to the following arm from another direction.

10. The drive switching lever structure according to claim 1, wherein the first interlinking means is a rigid member connected to the lever bracket from one direction and the second interlinking means is a flexible member connected to the following arm from another direction.

11. A drive switching lever structure for a vehicle, including a lever bracket swingably supported by a vehicle body side and a single control lever supported by the lever bracket swingably in a direction different from that of a swing of the lever bracket, in which the single control lever can operate a two-wheel-drive/four-wheel-drive switching mechanism and a differential lock on/off switching mechanism, the drive switching lever structure comprising:
    a following arm rotatably supported by the vehicle body side;
    first interlinking means, connected to the lever bracket, for operating an operating portion of one of the switching mechanisms; and
    second interlinking means, connected to the following arm, for operating an operating portion of the other of the switching mechanisms;
    wherein when the control lever is swung independently of the lever bracket, the following arm is swung in engagement with a shaft portion of the control lever, and
    wherein the lever bracket is swingably supported on a lower portion of a support frame attached to the vehicle body side, the support frame extending almost-perpendicularly to a vehicle-widthwise direction and being formed as an almost-rectangular shape elongated upwardly and downwardly, wherein the lever bracket is plate-shaped and is disposed along an outward facing surface of the support frame.

12. The drive switching lever structure according to claim 11, wherein the following arm is formed in a scissors-shape having a slit engageable with and disengageable from the shaft portion of the control lever.

13. The drive switching lever structure according to claim 12, wherein the following arm has play adapted to permit the swing of the control lever.

14. The drive switching lever structure according to claim 12, wherein the first interlinking means is connected to a lower end of the shaft portion of the control lever via the lever bracket.

15. The drive switching lever structure according to claim 12, wherein the first interlinking means is pivotably connected to a lower end of the lever bracket.

16. The drive switching lever structure according to claim 11, wherein the following arm has play adapted to permit the swing of the control lever.

17. The drive switching lever structure according to claim 11, wherein at least one of the interlinking means is a rod.

18. The drive switching lever structure according to claim 11, wherein the first interlinking means is a rigid member connected to the lever bracket from one direction and the second interlinking means is a flexible member connected to the following arm from another direction.

19. A drive switching lever structure for a vehicle, including a lever bracket swingably supported by a vehicle body side and a single control lever supported by the lever bracket swingably in a direction different from that of a swing of the lever bracket, in which the single control lever can operate a two-wheel-drive/four-wheel-drive switching mechanism and a differential lock on/off switching mechanism, the drive switching lever structure comprising:
- a following arm rotatably supported by the vehicle body side;
- first interlinking means, connected to the lever bracket, for operating an operating portion of one of the switching mechanisms; and
- second interlinking means, connected to the following arm, for operating an operating portion of the other of the switching mechanisms;
- wherein when the control lever is swung independently of the lever bracket, the following arm is swung in engagement with a shaft portion of the control lever, and further comprising:
- a support frame fixed to the vehicle body side that extends almost-perpendicularly to the vehicle-widthwise direction and that is formed in an almost-rectangular shape elongated upwardly and downwardly; and
- a plate-shaped support stay fixed to an upper portion of the support frame,
- wherein the following arm is swingably supported by a upper surface of the support stay.

20. The drive switching lever structure according to claim 19, wherein the following arm is formed in a scissors-shape having a slit engageable with and disengageable from the shaft portion of the control lever.

21. The drive switching lever structure according to claim 1, wherein the following arm is a bell crank, and the slit opens at a rear portion of a rear arm of the bell crank, and
- when the control lever is swung around a first swing shaft along with the lever bracket, the shaft portion of the control lever is capable of being inserted into and removed from the slit.

* * * * *